United States Patent [19]
Staub et al.

[11] Patent Number: 5,223,757
[45] Date of Patent: Jun. 29, 1993

[54] MOTOR COOLING USING A LIQUID COOLED ROTOR

[75] Inventors: Fred W. Staub, Schenectady, N.Y.; Eike Richter, Cincinnati, Ohio

[73] Assignee: General Electric Company, Schenectady, N.Y.

[21] Appl. No.: 549,840

[22] Filed: Jul. 9, 1990

[51] Int. Cl.⁵ .................. H02K 9/06; H02K 9/19; H02K 9/22
[52] U.S. Cl. ........................ 310/54; 310/61; 310/64
[58] Field of Search ............ 310/52, 55, 54, 58, 310/59, 60, 61, 64

[56] References Cited

U.S. PATENT DOCUMENTS

| | | | |
|---|---|---|---|
| 2,706,260 | 4/1955 | Heintz | 310/54 |
| 2,894,155 | 7/1959 | Labastie | 310/54 |
| 3,043,968 | 7/1962 | Ward | 310/54 |
| 3,088,042 | 4/1963 | Robinson | 310/54 |
| 3,260,872 | 7/1966 | Potter | 310/54 |
| 3,621,908 | 11/1971 | Pravda | 310/54 |
| 3,629,628 | 12/1971 | Rank | 310/54 |
| 3,648,085 | 3/1972 | Fujii | 310/54 |
| 3,765,480 | 10/1973 | Fries | 310/61 |
| 4,203,044 | 5/1980 | Linscott, Jr. | 310/61 |
| 4,405,876 | 9/1983 | Iversen | 313/30 |
| 4,622,687 | 11/1986 | Whitaker et al. | 378/130 |
| 4,625,324 | 11/1986 | Blaskis et al. | 378/130 |
| 4,943,746 | 7/1990 | Scherzinger et al. | 310/61 |
| 4,945,562 | 7/1990 | Staub | 378/130 |

FOREIGN PATENT DOCUMENTS 0021740 of 1901 United Kingdom .................. 310/54

Primary Examiner—Steven L. Stephan
Assistant Examiner—C. LaBalle
Attorney, Agent, or Firm—Patrick R. Scanlon; James C. Davis, Jr.; Paul R. Webb, II

[57] ABSTRACT

An dynamoelectric machine is provided having a hollow shaft adapted to receive fluid at one end and to discharge it at the other. The hollow shaft has a stack of laminations mounted thereon. A hollow disk is situated adjacent to and in contact with an axial end of the stack of laminations. The hollow disk includes a generally circular baffle for dividing the hollow disk into two interior sections and to cause the fluid to rotate at the same angular velocity as the hollow disk. The two interior sections are in flow communication with one another of the periphery at the generally circular baffle. The hollow shaft is in flow communication with one of the sections for providing fluid and in flow communication with the other section for removing fluid. A stator surrounds the laminations and is spaced away therefrom.

17 Claims, 2 Drawing Sheets

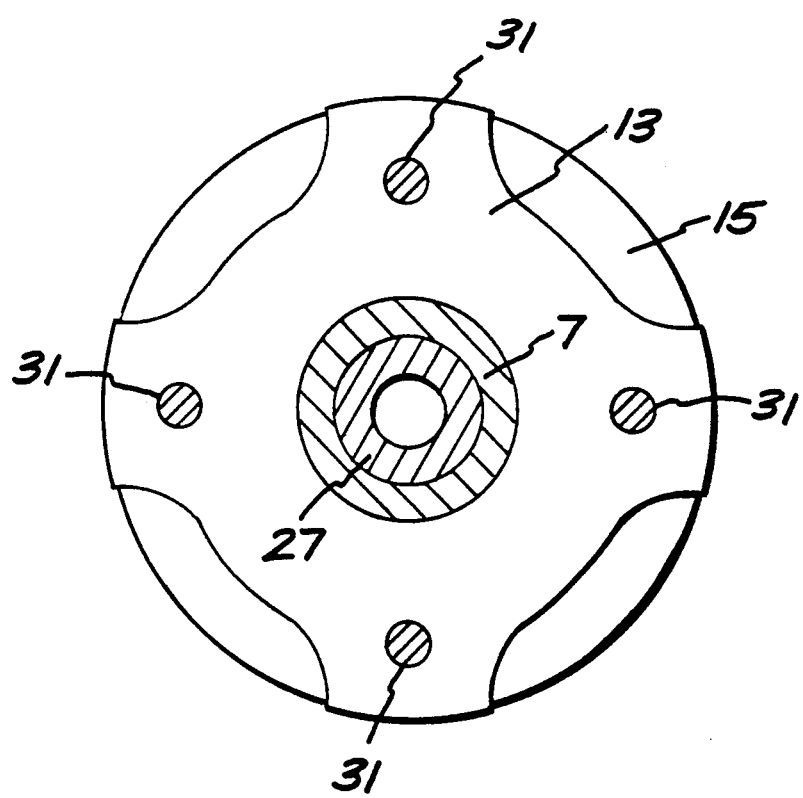

MOTOR COOLING USING A LIQUID COOLED ROTOR

CROSS REFERENCE TO RELATED APPLICATION

This application is related to Copending application Ser. No. 07/342,149, entitled "X-Ray Target Cooling", filed Apr. 24, 1989 and now U.S. Pat. No. 4,945,562, and assigned to the same assignee as the present invention.

BACKGROUND OF THE INVENTION

The present invention is related to liquid cooling of dynamoelectric machines and more particularly to rotor cooling in dynamoelectric machines.

High speed, high power density switched reluctance motors have a significant portion of the overall electromagnetic losses occur in the magnetic rotor laminations. Removal of these losses is done through liquid coolants which are guided through the shaft on which the rotor laminations are mounted. As the fluid cannot readily be brought into direct contact with the laminations, the heat has to be carried through the laminations to the shaft and then into the fluid. Effective heat transfer requires a large transfer area and high fluid velocity, the combination of which is difficult to achieve in the confines of the shaft. Present implementations result in significant heat input into the bearings and excessive heating of the lamination assembly, limiting the total power conversion capability of the machine because of the bearing and lamination assembly temperature restrictions.

High power density motors have been cooled using water cooled stators and/or heat pipes embedded in the rotor. Some large generators have been cooled with several circuits of water cooling passing through hollow rotor bars. In the case of rotor heat pipes, the removal of heat from the heat pipe condensing sections using forced air flow, still causes a major thermal resistance. While the water circuits in large rotors are very effective for rotor cooling, they would either excessively interfere with rotor performance in small motors or would be very costly and unreliable if made small enough to not interfere with motor performance.

It is an object of the present invention to provide a dynamoelectric machine with more effective heat transfer to a liquid in a cooled rotor.

It is a further object of the present invention to provide a dynamoelectric machine with increased heat transfer coefficients over the heat transfer surfaces in a liquid cooled rotor without the need for small coolant passages (microchannels) employing large coolant flow rates.

It is another object of the present invention to provide improved heat transfer to cooling fluids in a rotor in a relatively limited space for improved power density of the dynamoelectric machine.

It is a still further object of the present invention to provide a dynamoelectric machine not requiring high coolant flow rates and complex coolant passageways difficult to manufacture and operate reliably.

SUMMARY OF THE INVENTION

In one aspect of the present invention a dynamoelectric machine is provided having a hollow shaft adapted to receive fluid at one end and to discharge it at the other. The hollow shaft has a stack of laminations mounted thereon. A hollow disk is situated adjacent to and in contact with an axial end of the stack of laminations. The hollow disk is in flow communication with the hollow shaft. The hollow disk includes means for imparting centrifugal acceleration to a liquid in the hollow disk when the shaft is rotating. A stator surrounds the laminations and is spaced away therefrom.

In another aspect of the present invention a dynamoelectric machine is provided having a hollow shaft adapted to receive fluid at one end and to discharge it at the other. The hollow shaft has a stack of laminations mounted thereon. A hollow disk is situated adjacent to and in contact with an axial end of the stack of laminations. A tubular insert fabricated from a material with a higher thermal conductivity than the shaft is situated inside the hollow shaft and in contact therewith. A stator surrounds the laminations and is spaced away therefrom.

BRIEF DESCRIPTION OF THE DRAWING

The subject matter which is regarded as the invention is particularly pointed out and distinctly claimed in the concluding portion of the specification. The invention, however, both as to organization and method of practice, together with further objects and advantages thereof, may best be understood by reference to the accompanying drawing figures in which:

FIG. 2 is a sectional view of FIG. 1 along the lines 2—2.

DETAILED DESCRIPTION OF THE INVENTION

Figure 1:
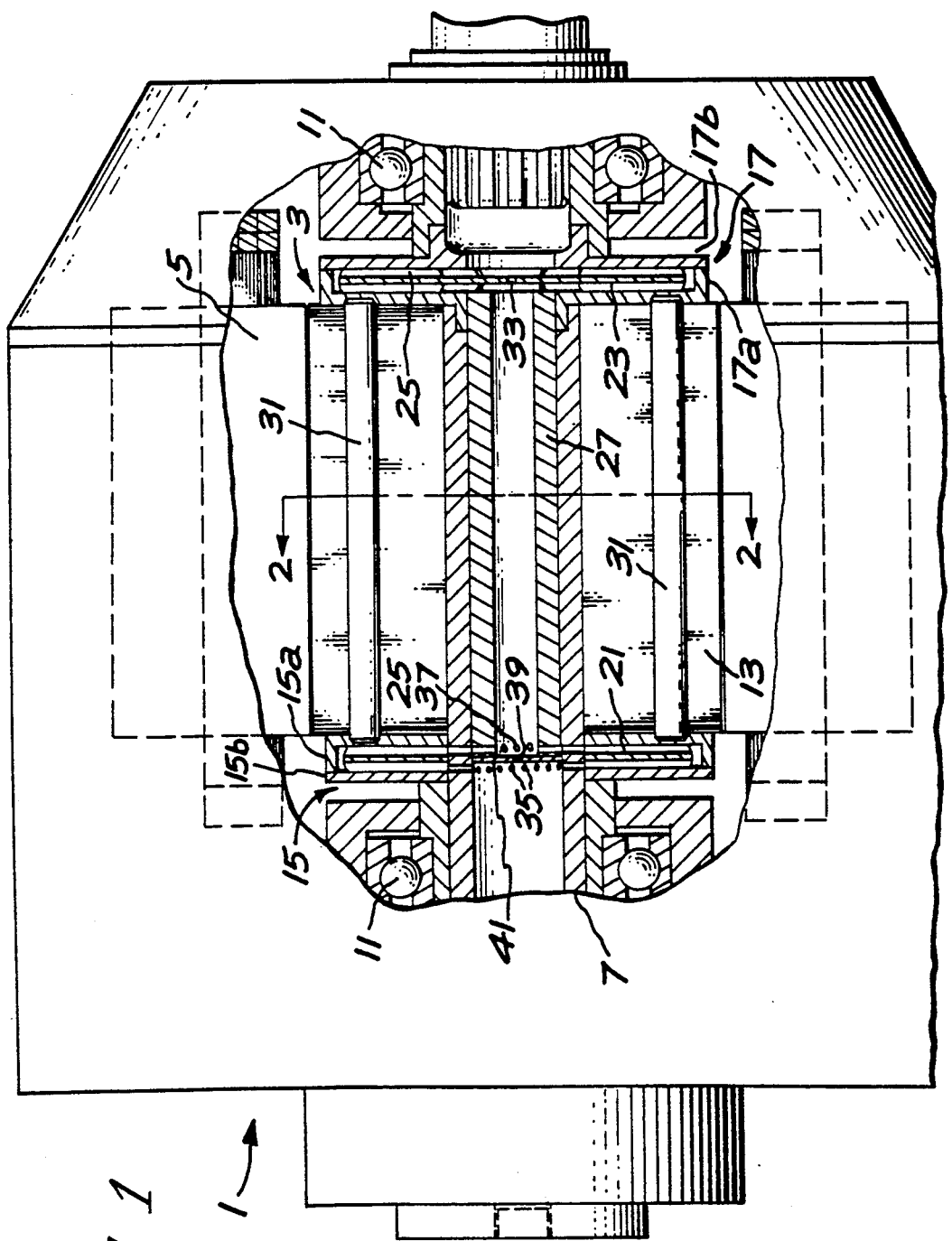
FIG. 1 is a partially cutaway side view of a portion of a switched reluctance motor.

Referring now to the drawing wherein like numerals indicate like elements throughout and particularly FIG. 1 thereof, a switched reluctance motor, having a rotor 3 and a stator 5 is shown. The rotor has a hollow shaft 7 rotatably mounted in bearings 11. The shaft can be fabricated from hardenable tool steel. Referring now to FIGS. 1 and 2, the hollow shaft 7 supports a stack of laminations 13. Situated on either axial end of the rotor laminations and in contact therewith are hollow rotating disks 15 and 17 affixed to the shaft. The disks are preferably slightly smaller in diameter than the outer diameter of the laminations to avoid eddy current heating. If the disks 15 and 17 have a diameter nearly as large as laminations, then they are preferably fabricated from nonmagnetic material such as 300 series stainless steel. If disks have a smaller diameter, approximately the same as the smallest diameter of the laminations, restriction to nonmagnetic material is not necessary. Each of the hollow rotating disks 15 and 17 is divided into two sections by a circular baffle 21 and 23, respectively, which rotates with the disk. The baffles each have a plurality of vanes 25 on both faces for imparting a tangential force to the liquid in both sections when the disk is rotating. In situations where subcooled boiling is desirable such as when a fuel which would suffer degradation due to boiling is not being used, partial radial vanes not extending to the baffle periphery, can be used to insure the pressure conditions required for boiling. Subcooling boiling enhances the heat transfer coefficient from the walls of the hollow disk to the liquid. Vane configurations for achieving subcooled boiling are shown in copending application Ser. No. 07/342,149, entitled "X-Ray Target Cooling", U.S. Pat. No. 4,945,562, hereby incorporated by reference. The baffles have a diameter less than the interior of the hollow rotating disk permitting flow communications between the two sections in the hollow disk at the baffle periphery. One of the sections in each of the hollow rotating disks is in flow communication with the hollow shaft for receiving cooling liquid and the other section of the hollow disk is in flow communication with the hollow shaft for discharging liquid back to the shaft. Cooling liquid which can be aviation fuel in applications where the motor is used to pump fuel or any other cooling liquid, such as water or oil, is supplied at one end of the shaft and removed at the other.

To further improve heat removal from the rotor, which comprises the hollow shaft 7, laminations 13 and hollow disks 15 and 17, an insert 27 of high heat conductivity material such as a copper or aluminum tube where copper is preferred because of its higher thermal conductivity, can be inserted inside the hollow shaft 7, in good heat transfer relationship with the portion of the shaft around which the laminations are situated. A high heat conductivity insert can be put in place by heat shrinking to assure good heat transfer between the shaft and the insert. The insert serves three purposes. First, the insert reduces the diameter of the hollow shaft increasing the fluid velocity. This improves rotor cooling, when the flow is turbulent, since the heat transfer coefficient increases faster than the effect of surface area decreases resulting in larger thermal conductance whether or not hollow cooling disks are used. Second, the insert provides a fin effect to further increase the thermal conductance to the fluid in the shaft. Third, the insert 27 improves the heat transfer from the laminations 13 to the cooling disks by reducing the thermal conductance therebetween. Thermal conductivity of copper, for example, is much greater than hardenable tool steel.

Additional heat removal can also be achieved by inserting axially extending rods 31 of high thermal conductivity material such as copper or aluminum in the laminations. If the rods are embedded below the surface of the lamination stack, interference with motor operation should be minimal. The rods are in good thermal contact with the cooling disks at either end and assist in the heat flow in the axial direction.

One of the hollow disks 17 can be used to form a portion of the shaft, with the hollow disk brazed to the shaft. The hollow disks 15 and 17 themselves are formed from two pieces. A cup shaped piece 15a and 17a having a circular plate with an axial extending rim and a circular cover plate 15b and 17b which seals against the rim by brazing, for example. The baffle 23 with vanes 25 is situated between the two disk pieces 17a and 17b and helps to divert the axial flow from the shaft through the hollow disk. A small central aperture 33 in the baffle 23 allows any entrained gas to continue to flow axially. To achieve good heat transfer between the hollow shaft 7 and the laminations 15, the laminations can be shrunk fit to the shaft with the copper rods in place when the laminations are press fit. The copper rods are aligned with counterbored holes in the hollow disks with heat conductive epoxy used in the holes. A heat conductive epoxy is also used between the oxide treated laminations 13. A space is left between the ends of the rods and the bottom of the counterbored holes to allow for differential thermal expansion. After the laminations are pressed in place, the other hollow disk 15 can be press fit or brazed over two axially separated groups of circumferentially arranged holes 35 and 37 on the hollow shaft 7. The circular baffle 21 has a central aperture which fits around the shaft. One group of holes is in flow communication with one of the sections of the hollow shaft and the other group of holes is in flow communication with the other section. A circular plug 41 is placed in the hollow shaft between the axially spaced holes 35 and 37 to prevent axial flow and allow the flow to divert through the hollow disk. The circular plug has a small central aperture 39 to allow any gas entrained in the flow to continue axially and not be trapped by the rotating fluid in the hollow disk.

In operation, cooling fluid is introduced into one end of the hollow rotating shaft 7. The fluid is diverted into one section of the hollow disk where the fluid is subjected to centrifugal acceleration by the vanes 25 and flows radially-outwardly to the perimeter of the disk 15 and then radially inwardly towards the shaft on the other side of the baffle. Free convection heat transfer increases with increasing acceleration. The fluid again returns to the hollow shaft, flows along the shaft, and is again accelerated outwardly into the other hollow disk 17 and back to the shaft. If a high heat conductivity insert 27 is used, heat transfer from laminations to the cooling liquid is improved and fluid velocity is increased in the shaft. The increased velocity due to the insert needs to be balanced against the decrease in surface area and increase in pressure drop caused by the insert. When the flow is turbulent a net gain in heat transfer to the fluid in the shaft takes place. If the axially extending rods 31 are also used, axial heat conduction to the hollow disks 15 and 17 is improved. A significant amount of the heat generated in the rotor is generated near the outer portion of the laminations in the vicinity of the rods. The rods provide a lower thermal resistance path to the hollow disks than do the laminations. Because of the greater coefficient of expansion of the copper and aluminum rods compared to the laminations, the rods expand more during operation than do the laminations and press against the hollow disks improving heat transfer.

Thermal analysis of the rotor of a switch reluctance motor rated at 90 kw at 25,000 rpm, having an outer lamination diameter of approximately 3.2 inches, cooled by a hollow shaft having an inside diameter of 0.75 inches by 2.5 gallons per minute when compared with the same rotor to which hollow disks at outer end of the laminations stack are added and neglecting the effects of bearing heating and heat from the stator, and assuming an ambient air temperature of 160° C., results in a calculated temperature rise that is only 67% of the temperature rise of the rotor without the hollow disks. The hollow disks have 0.0625 inches clearance between the baffle and each of the inner walls of the disk. The calculated result when a 0.32 inch inside diameter copper insert is placed in the hollow shaft and the hollow disks are not used is a temperature rise of 72% of the temperature rise occurring when just the hollow shaft cooling was used. The calculated result when both the copper insert and the two hollow disks are used together is a temperature rise of 50% of that using just a hollow shaft for cooling.

While a switched reluctance machine has been shown, improved cooling of the rotor of induction machines and brushless synchronous machines, for example, can also be obtained with the present invention.

The foregoing has described a dynamoelectric machine using a liquid cooled rotor which provides more effective heat transfer to the cooling fluid in a relatively limited space for improved power density of a dynamoelectric machine.

While the invention has been particularly shown and is described with reference to an embodiment thereof, it will be understood by those skilled in the art that various changes in form and detail may be made without departing from the spirit and scope of the invention.

What is claimed is:

1. An dynamoelectric machine comprising:
    a hollow shaft rotatably mounted in the machine and adapted to receive fluid at one end and discharge it at the other;
    a stack of laminations mounted on said hollow shaft;
    a hollow disk mounted on said hollow shaft, said disk having side walls and an internal chamber in flow communication with said hollow shaft and being located adjacent to an axial end of said stack of laminations so that one side wall of said hollow disk is in contact with said axial end, said hollow disk including means for imparting centrifugal acceleration to a liquid in said hollow disk when said shaft is rotating; and
    a stator surrounding said laminations and spaced away therefrom.

2. The dynamoelectric machine of claim 1, further comprising a tubular insert situated inside said hollow shaft and in contact therewith, said insert being fabricated from a material with a higher thermal conductivity than said shaft and being open at both ends so as to permit fluid to flow therethrough.

3. The dynamoelectric machine of claim 2 wherein said insert material is selected from the group of high thermal conductivity materials consisting of copper and aluminum.

4. The dynamoelectric machine of claim 2 wherein said insert is shrunk fit inside said hollow shaft.

5. The dynamoelectric machine of claim 1, further comprising a plurality of heat conductive members extending axially through said lamination and in contact with said hollow disk.

6. The dynamoelectric machine of claim 5 wherein said plurality of heat conductive members are fabricated from a material selected from the group consisting of copper and aluminum.

7. The dynamoelectric machine of claim 1 further comprising a second hollow disk mounted on said hollow shaft, said second disk having side walls and an internal chamber in flow communication with said hollow shaft and being located adjacent to the other axial end of said stack of laminations so that one side wall of said second hollow disk is in contact with said other axial end, said second hollow disk including means for imparting centrifugal acceleration to a liquid in said second hollow disk when said shaft is rotating.

8. An dynamoelectric machine comprising:
    a hollow shaft rotatably mounted in the machine and adapted to receive fluid at one end and discharge it at the other;
    a stack of laminations mounted on said hollow shaft;
    a hollow disk mounted on said hollow shaft, said disk having side walls and an internal chamber and being located adjacent to an axial end of said stack of laminations so that one side wall of said hollow disk is in contact with said axial end, said hollow disk including a baffle for dividing the internal chamber into two interior sections, said two interior sections in flow communication with one another at the periphery of said baffle, said baffle having vane means for imparting a tangential velocity to said fluid, said hollow shaft in flow communication with one of said sections for providing fluid, and in flow communication with the other section for removing fluid; and
    a stator surrounding said laminations and spaced away therefrom.

9. The dynamoelectric machine of claim 8, further comprising a tubular insert situated inside said hollow shaft and in contact therewith, said insert being fabricated from a material with a higher thermal conductivity than said shaft and being open at both ends so as to permit fluid to flow therethrough.

10. The dynamoelectric machine of claim 9, wherein said insert material is selected from the group of high thermal conductivity materials consisting of copper and aluminum.

11. The dynamoelectric machine of claim 9 wherein said insert is shrunk fit inside said hollow shaft.

12. The dynamoelectric machine of claim 8, further comprising a plurality of heat conductive members extending axially through said stack of laminations and in contact with said hollow disk.

13. The dynamoelectric machine of claim 12 wherein said plurality of heat conductive members are fabricated from a material selected from the group consisting of copper and aluminum.

14. The dynamoelectric machine of claim 9 further comprising a second hollow disk mounted on said hollow shaft, said second disk having side walls and an internal chamber and being located adjacent to the other axial end of said stack of laminations so that one side wall of said second hollow disk is in contact with said other axial end, said second hollow disk including a baffle for dividing the internal chamber of said second hollow disk into two interior sections, said two interior sections in flow communication with one another at the periphery of said baffle, said baffle having vane means for imparting a tangential velocity to said fluid, said hollow shaft in flow communication with one of said sections for providing fluid, and in flow communication with the other section for removing fluid.

15. An dynamoelectric machine comprising:
    a hollow shaft rotatively mounted in the machine, said shaft having one open end where a coolant is introduced into said shaft and another open end where the coolant is discharged from said shaft;
    a stack of laminations mounted on said hollow shaft;
    a tubular insert situated inside said hollow shaft and in contact therewith, said insert being fabricated from a material with a higher thermal conductivity than said shaft and being open at both ends so as to permit fluid to flow therethrough; and
    a stator surrounding said laminations and spaced away therefrom.

16. The dynamoelectric machine of claim 15, wherein said insert material is selected form the group of high thermal conductivity materials consisting of copper and aluminum.

17. The dynamoelectric machine of claim 15 wherein said insert is shrunk fit inside said hollow shaft.

* * * * *